United States Patent
Story et al.

(10) Patent No.: US 12,417,092 B2
(45) Date of Patent: *Sep. 16, 2025

(54) MODEL TRAINING USING BUILD ARTIFACTS

(71) Applicant: Stripe, Inc, South San Francisco, CA (US)

(72) Inventors: William Story, San Francisco, CA (US); David Hwang, Boston, MA (US)

(73) Assignee: STRIPE, INC., South San Francisco, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/373,261

(22) Filed: Sep. 26, 2023

(65) Prior Publication Data

US 2024/0020114 A1    Jan. 18, 2024

Related U.S. Application Data

(63) Continuation of application No. 17/521,639, filed on Nov. 8, 2021, now Pat. No. 11,809,863, which is a continuation of application No. 17/014,618, filed on Sep. 8, 2020, now Pat. No. 11,216,273.

(51) Int. Cl.
*G06F 8/71* (2018.01)
*G06F 9/455* (2018.01)
*G06N 20/00* (2019.01)

(52) U.S. Cl.
CPC ............ *G06F 8/71* (2013.01); *G06F 9/45558* (2013.01); *G06N 20/00* (2019.01); *G06F 2009/45562* (2013.01); *G06F 2009/45595* (2013.01)

(58) Field of Classification Search
USPC .................................................. 717/120–123
See application file for complete search history.

(56) References Cited

U.S. PATENT DOCUMENTS

| | | | |
|---|---|---|---|
| 10,664,742 B1 | 5/2020 | Farivar et al. | |
| 11,216,273 B1 | 1/2022 | Story et al. | |
| 11,341,367 B1 * | 5/2022 | Barbosa | G06F 18/2148 |
| 11,537,439 B1 * | 12/2022 | Liberty | G06F 9/5077 |
| 12,242,928 B1 * | 3/2025 | Chen | G06N 20/20 |
| 2017/0344910 A1 * | 11/2017 | Wu | G06N 20/00 |
| 2019/0114167 A1 | 4/2019 | Biddle | |
| 2019/0155633 A1 | 5/2019 | Faulbaher, Jr. et al. | |
| 2019/0286547 A1 | 9/2019 | Ramraz | |

(Continued)

FOREIGN PATENT DOCUMENTS

WO    WO 2022/055891    3/2022

OTHER PUBLICATIONS

International Search Report and Written Opinion from PCT/US/2021/049300, dated Dec. 24, 2021, 7 pages.

*Primary Examiner* — Qing Chen
(74) *Attorney, Agent, or Firm* — BAKERHOSTETLER

(57) ABSTRACT

The subject technology detects a code commit at a code repository. The subject technology sends a request for a build job to a build server. The subject technology determines that the build job is completed. The subject technology sends a training request and user token to a proxy authenticator. The subject technology determines determining that the user token is validated. The subject technology sends a training request and the user token to a training job manager. Further, the subject technology determines determining that the training job is completed.

20 Claims, 8 Drawing Sheets

(56) References Cited

U.S. PATENT DOCUMENTS

| | | |
|---|---|---|
| 2019/0332938 A1 | 10/2019 | Gendron-Bellemare et al. |
| 2020/0167475 A1 | 5/2020 | Liu et al. |
| 2020/0258412 A1 | 8/2020 | Liedtke et al. |
| 2021/0097444 A1* | 4/2021 | Bansal ................. G06F 9/5066 |

\* cited by examiner

MODEL TRAINING USING BUILD ARTIFACTS

CROSS-REFERENCE TO RELATED APPLICATIONS

This application is a continuation of U.S. patent application Ser. No. 17/521,639, entitled "MODEL TRAINING USING BUILD ARTIFACTS," filed on Nov. 8, 2021 and issued as U.S. Pat. No. 11,809,863 on Nov. 7, 2023, which is a continuation of U.S. patent application Ser. No. 17/014,618, entitled "MODEL TRAINING USING BUILD ARTIFACTS," filed on Sep. 8, 2020 and issued as U.S. Pat. No. 11,216,273 on Jan. 4, 2022, the disclosure of each of which is hereby incorporated herein in its entirety.

TECHNICAL FIELD

The subject matter disclosed herein generally relates to the technical field of machine learning models utilized in a network-based computing environment.

BACKGROUND

The present subject matter seeks to address technical problems that exist in developing and training machine learning models.

BRIEF DESCRIPTION OF THE DRAWINGS

Some embodiments are illustrated by way of example and not limitation in the figures of the accompanying drawings.

DETAILED DESCRIPTION

Figure 1:
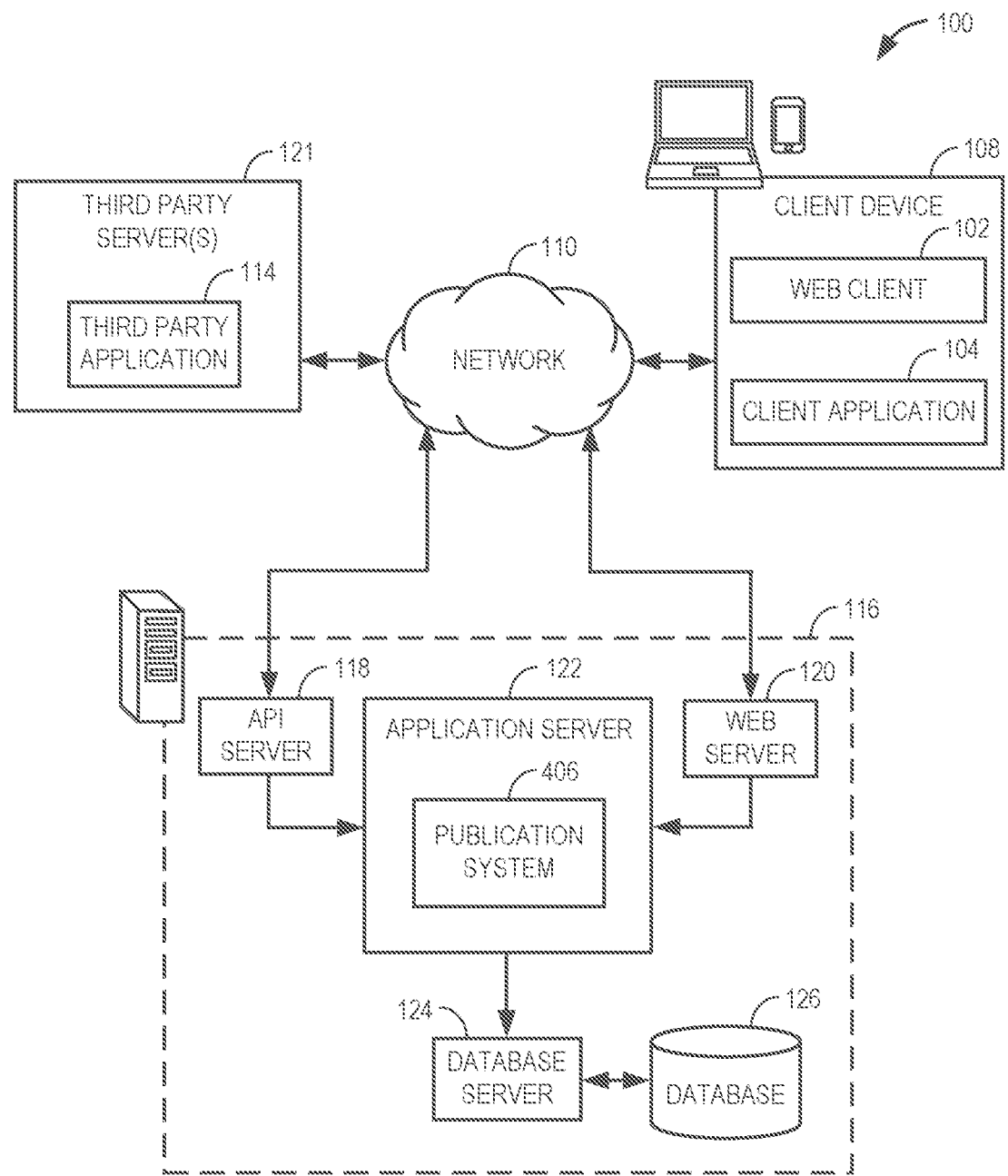
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Machine learning (ML) has seen a rise in popularity in recent years due to the availability of massive amounts of training data, and advances in more powerful and efficient computing hardware. Machine learning may utilize models that are executed to provide predictions (e.g., fraud detection) in particular applications among many other types of applications.

A machine learning lifecycle may include the following distinct stages: data collection, annotation, exploration, feature engineering, experimentation, training, evaluation, and deployment. The machine learning lifecycle can be iterative from data collection through evaluation. At each stage, any prior stage could be revisited, and each stage can also change the size and shape of the data used to generate the ML model.

A machine learning development lifecycle may be highly-iterative and experimental. For example, experiments involving tens or hundreds of input features and model parameters may be required to produce an accurate and well-calibrated ML model. In an example, a team of users (e.g., developers) conduct experiments and tests with many data inputs, often in both local and distributed (e.g., networked) computing environments.

Existing systems for developing machine learning models can support various phases of the development lifecycle, such as model training, experimentation, evaluation, and deployment. Such systems can utilize various data management systems, such as cloud storage services, distributed file systems, or other database solutions, each of which can vary in the steps to access and utilize by users. Thus, development environments utilized by users (e.g., developers) are often provided in a distributed computing environment in which one or more cloud services and platforms are leveraged.

In a highly experimental development process, it can be beneficial that an efficient and effective development environment is provided. Existing development systems may not be well designed for efficient development of machine learning models that can handle experimental workloads without burdening developers with an arduous process or excessive number of steps for generating results from machine learning models that are undergoing development. In particular, system configurations may differ depending on a given service or platform, which could require users to maintain different configurations depending on which particular environment or platform that a given model is to be trained on at that time. Moreover, existing systems can employ virtualization technologies that include disadvantages in terms of performance and computing resource utilization. Consequently, the development time for a given machine learning model could increase, driving up the costs for development while also increasing utilization of computing resources. Additionally, such systems also may not prove to be scalable as a number of users increases.

Existing system further may not include sufficient automated mechanisms for tracking users who are training machine learning models and may access sensitive or confidential training data. In an example, an ad-hoc review of code changes (e.g., by another engineer) can be required before permitting a user, who submitted the code changes, to train a model based on such changes. Although often inefficient, this form of review process is common throughout organizations to ensure the security of code changes. Notwithstanding this review process, existing systems that support distributed development environments (e.g., where multiple users in different locations work on a shared code base) may also lack the ability to effectively track which users executed particular code corresponding to the changes to the code related to a machine learning model. The subject system addresses such inefficiencies by providing a robust security audit trail through using tokens that authenticate users and track which users executed certain code, in a distributed development environment, that were introduced in the machine learning model (e.g., corresponding to a particular build artifact).

A networked system, as described by embodiments herein, provides a development environment for faster training and deployment for machine learning models that addresses the aforementioned challenges. In example embodiments, the subject system utilizes container technology, such as a container platform, that allows several containers to run on the same host or virtual machine, each of which is a separate virtual environment or application. Training of a given ML model can be performed within such a container that eventually generates, upon completion of training, training artifacts which include a serialized model and evaluation data. In an example, a web service deploys the serialized model for use in a given application.

Implementations of the subject technology improve the computing functionality of a given electronic device by 1) de-coupling part of the development (e.g., training) of a machine learning model from a local client machine to a computing environment with more resources thereby reducing development time and local workloads, 2) providing a more secure computing environment afforded by a container (e.g., process isolation) that serves as a host for training the model, and 3) providing a quicker and easier way for scaling the development of machine learning models as more users are involved in the development or as the complexity of the model increases. These benefits therefore are understood as improving the computing functionality of a given electronic device, such as an end user device which may generally have less computational and/or power resources available than, e.g., one or more cloud-based servers.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor 530) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 121, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
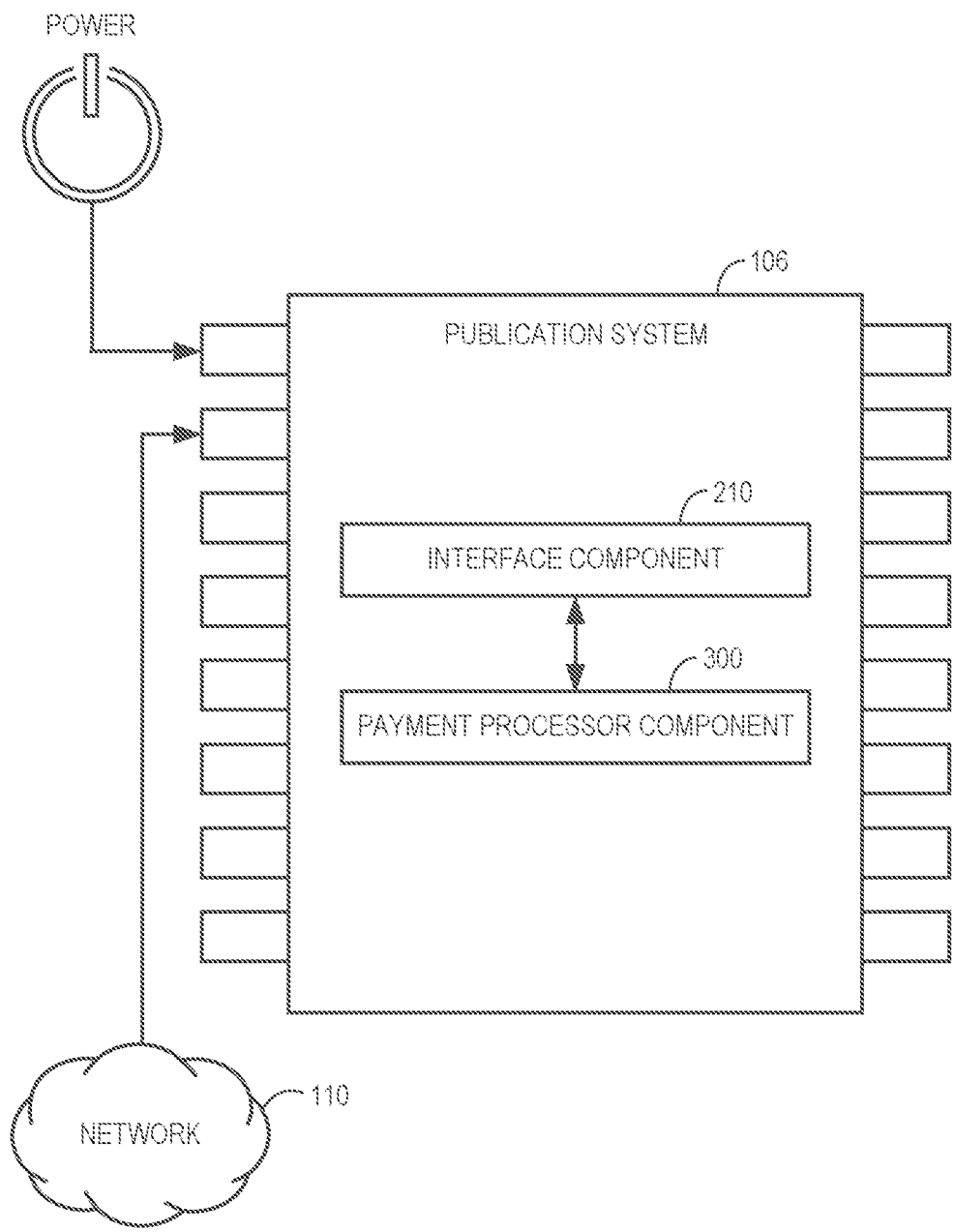
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor (e.g., a payment processor 530, FIG. 5) in accordance with the methods described herein with reference to the accompanying drawings.

Figure 3:
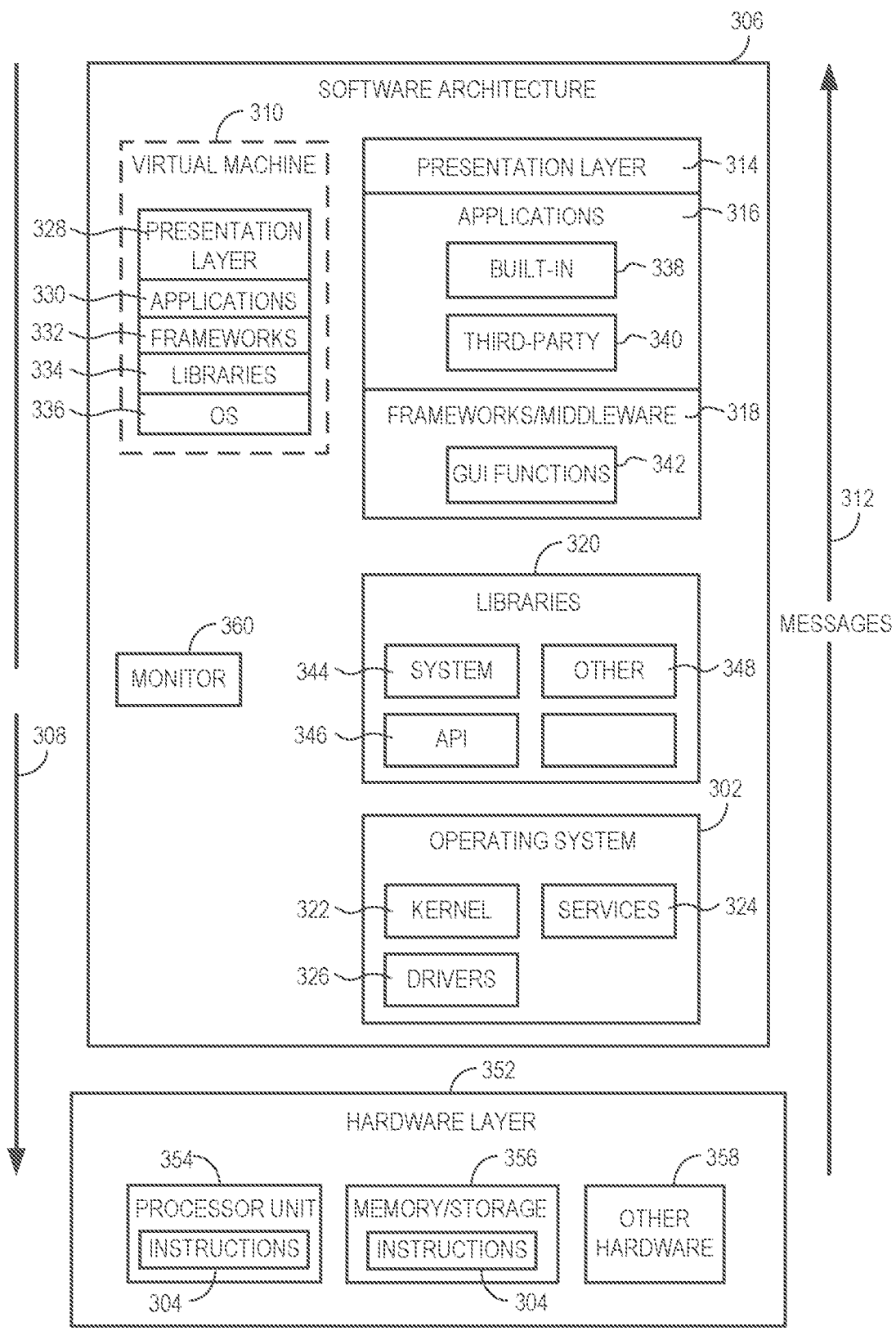
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/ output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
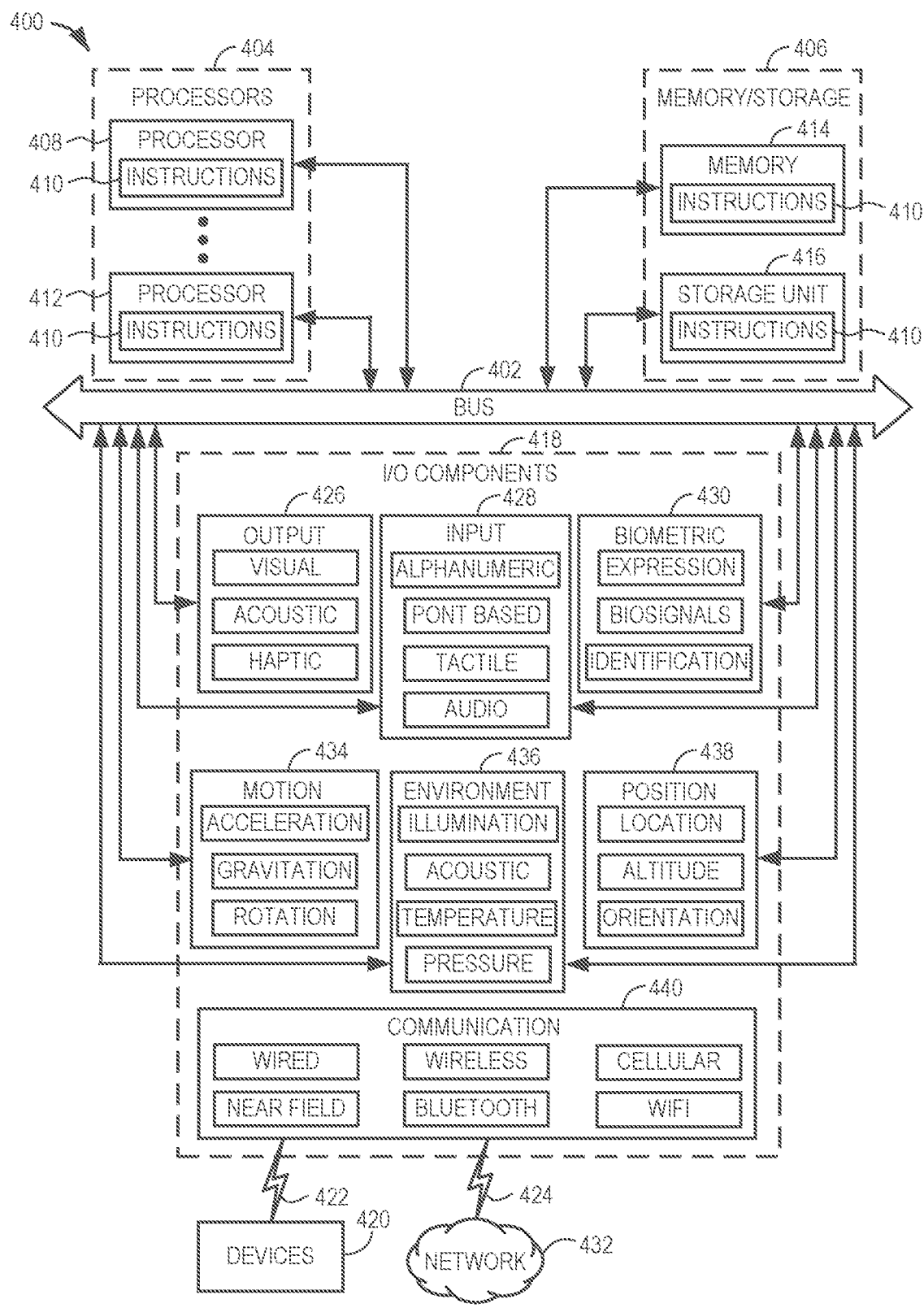
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a single-use token. The single-use token can be safely passed to the merchant's systems and used later to charge customers. Merchants have complete control of their customers' payment experience without ever handling, processing, or storing sensitive payment information.

Figure 5:
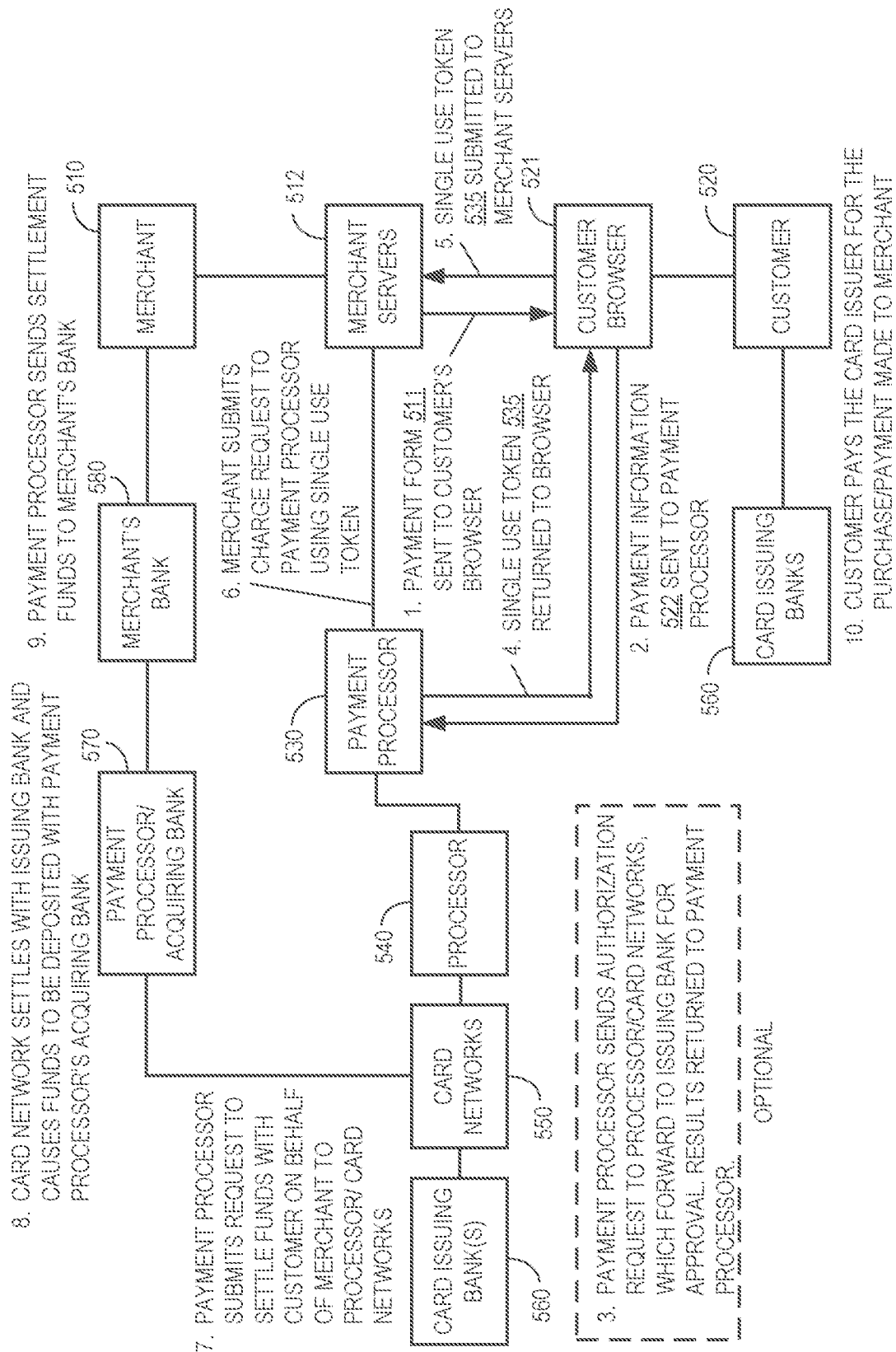
FIG. 5 is a block diagram showing aspects of an online method for conducting a transaction between a merchant site and an electronic user device using a payment processor, according to an example embodiment.

Viewed generally in one example, and with reference to FIG. 5, a payment processing flow is now described:

1. The merchant's customer 520 uses an Internet-enabled browser 521 to visit the merchant's site. The customer 520 is served a JavaScript library—enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.
2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application.
3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.
4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.
5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.
6. The merchant 510 uses the single-use token 535 to submit a charge request to the payment processor 530 (or to create a customer object for later use). In this step, the payment processor 530 submits a request to authorize the charge to the processor 540 or directly to the card network 550. This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.
7. The payment processor 530 settles the charge on behalf of the merchant 510 with the processor 540 or directly with the card network 550.
8. The card network 550 causes the funds to be paid by the card issuing bank 560 to the payment processor 530 or to the payment processor's acquiring bank 570.
9. The payment processor 530 causes the settled funds to be sent to the merchant 510 (or to the merchant's bank 580), net of any applicable fees.
10. The card issuing bank 560 collects the paid funds from the customer 520.

Not all of the steps listed above need happen in real time. Other examples, arrangements, and functionality are possible. Applicant's published patent application US 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service,"

in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

Embodiments of the subject technology advantageously provide more efficient approaches and techniques for developing machine learning models that can drastically reduce a number of steps that a given user (e.g., a developer) is required to perform in order to train and/or deploy a machine learning model in a secure manner. Machine learning models utilize vast amounts of data, including training data. In an example where the model is providing predictions, a goal of model development is to ensure that such predictions are accurate in most instances (or within a margin that is tolerated based on the user's expected standards, design specification, tolerances, and the like) such that the model can be eventually deployed in a commercial environment or application.

Such massive amounts of data has increased the adoption of distributed development endorsements where cloud platforms and resources are often utilized by client devices to perform certain tasks (e.g., for storing training data, for executing models that consume such data, and the like). Compared with such existing and previous approaches for developing machine learning models, the subject system described in embodiments herein implements a better integration with a container platform. The container platform described herein provides containers that enable quicker development of machine learning models by dynamically utilizing cloud resources and ensuring security of the data. In comparison with virtualization platforms where virtual machines (e.g., virtualizing an entire machine or hardware architecture) may be utilized for performing tasks, the container platform offers a more lightweight approach by virtualizing, in an example, a given operation system (instead of the entire hardware architecture underneath).

In particular, containers virtualize at the application layer (instead of virtualizing at the hardware level like a virtual machine), and can utilize one machine, share an operating system kernel, and virtualize an operating system to run processes that are isolated. Consequently, the container platform described herein offers a more advantageous approach to machine learning development as containers are more lightweight compared to virtual machines, and are easier to manage and started for performing tasks (e.g., training a model) for a given machine learning model.

Figure 6:
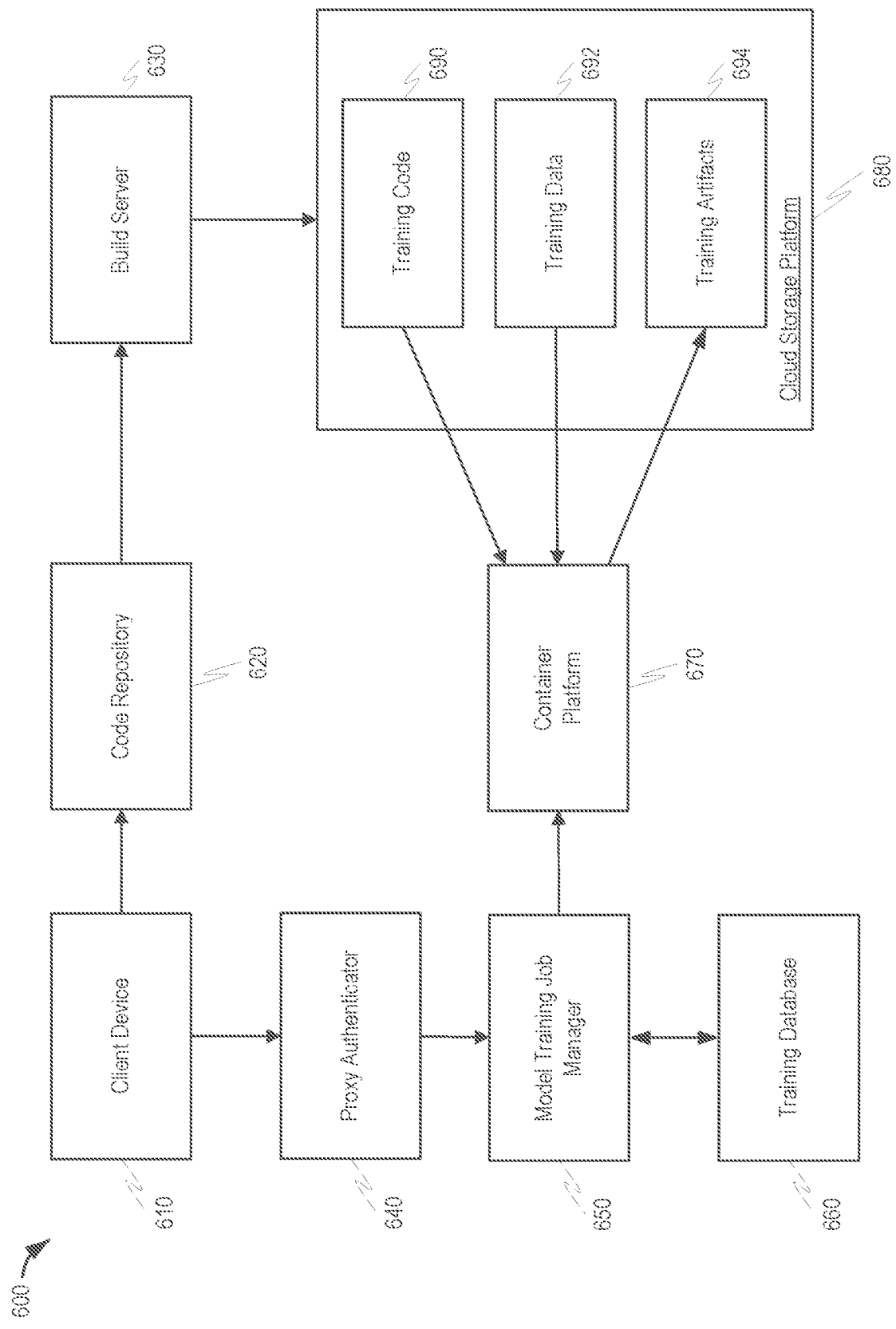
FIG. 6 is conceptual illustration of a data flow diagram for training machine learning models using build artifacts in an example software architecture, in accordance with some embodiments of the present disclosure.

FIG. 6 is conceptual illustration of a data flow diagram for training machine learning models using build artifacts in an example software architecture 600, in accordance with some embodiments of the present disclosure.

As illustrated in FIG. 6, the software architecture 600 includes client device 610, code repository 620, build server 630, proxy authenticator 640, model training job manager 650, container platform 670, cloud storage platform 680, and training database 660.

The client device 610 may be, for example, desktop computer, a portable computing device such as a laptop computer, a smartphone, a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. The client device 610 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. The client device 610 may be, and/or may include all or part of, client device 108, software architecture 306, or machine 400.

In an implementation, client device 610 corresponds to a user's (e.g., the developer client machine such as a laptop or desktop computer) machine that can include a given development environment for developing machine learning models. In an example, such a development environment can include various tools such as programming language compilers, local execution environments, text editors, and a software development environment such as a computer program that a software developer can use to create compiled (e.g., executable) code, debug, maintain, or otherwise support computer programs and applications. For example, the software development environment, using the compiled code, can create a software package for deployment with facilitation from code repository 620, and build server 630 (or any other components of software architecture 600).

In an embodiment, code repository 620 is implemented as a distributed version control system (or service) that enables storing code (e.g., files and folders) that are part of implementing a machine learning model in a given programming language(s). Each user can generate or modify a particular version of code on their particular client device (e.g., the client device 610), which is then pushed to code repository 620 for merging with existing code, if any, and storage. For example, code repository 620 provides features that enable tracking, versioning, and merging changes to the code to facilitate a more coordinated development of the machine learning model that can avoid conflicts or unintended merges when multiple users perform edits on the same code. More specifically, code for a given machine learning model can be stored in a particular repository (e.g., directory or storage space) managed by code repository 620, which corresponds to a location where the code for the machine learning model is stored by code repository 620. In an example, such a repository can be stored locally at code repository 620 or at a remote storage location (e.g., in cloud or distributed storage) that can be accessed by code repository 620.

In practice, machine learning models, including deep neural networks, are difficult to optimize, particularly for real world performance. Thus, parameters to a given machine learning model are often changed in order to improve accuracy of a prediction, minimize a loss function, adjust values for weights and bias, and the like. To illustrate why changes to a machine learning model often occur, thereby requiring code changes, the following discussion is provided.

For example, a given loss function provides a measure of a difference between a predicted value and an actual value, which can be implemented using a set of parameters where the type of parameters that are utilized can impact different error measurements. A challenge in machine learning is that a given machine learning model algorithm should, in order to provide a good model, perform well on new, previously unseen inputs, and not solely on the inputs which the model was trained. The ability to perform well on previously unobserved inputs is called generalization in an example.

When training a machine learning model, an error measure on a given training set of data can be determined, called the training error, with a goal of reducing this training error during training. Additionally, in developing the machine learning algorithm, it is also a goal to lower the generalization error, also called the test error, which is a measure of how accurately an algorithm is able to predict outcome values for previously unseen data. Consequently, in the aforementioned examples, parameters of the loss function are updated (e.g., during the training process of the model) in order to improve the aforementioned error measurements. This could result in additional code commits in code repository 620, and additional build job requests and training job requests that are handled by the subject system as described herein.

In an embodiment, each instance in which code is pushed (e.g., sent) to code repository 620, a commit command is performed to store the code and any changes to the corresponding repository. Further, each time a commit command is performed, a hash string (or value) which identifies the commit and its associated code is generated. In an example, this hash string is determined using a secure hash algorithm (e.g., SHA-1, SHA-2, SHA-3, SHA-256, and the like) to a predetermined length (e.g., 160 bits or 20 bytes). As discussed further below, the commit hash string (or identifier) is utilized by the subject system to track requests for training a machine learning model corresponding to committed code.

In an embodiment, build server 630 is implemented as a system that enables development, building, testing, and deployment of code. Build server 630 can be configured to execute build jobs where each job can include a set of tasks for building code related to a given machine learning model. In an example, code repository 620 and build server 630 are in communication such that code from a repository can be sent from build server 630 and received by build server 630. Code repository 620, for example, can send a request to initiate a build job based on a particular code commit (discussed above) to build server 630. The build server 630, in an implementation, can also be configured to periodically poll code repository 620 to determine whether new changes have occurred to the repository and automatically commence build jobs (e.g., by retrieving the change code from code repository 620). Alternatively (or conjunctively), code repository 620 can push notifications to build server 630 to indicate when changes are made to code in the repository (e.g., code commits), which can then initiate build server to perform a build job based on the changed code.

In an embodiment, build server 630 executes a job to build the received code that generates a build artifact. In an example, a build artifact can be in the form of a compressed file, archive file, or package. Each build artifact can be associated with a particular commit hash string (or identifier) corresponding to the committed code that was utilized to generate the build artifact. In an embodiment, build server 630 can send a message (e.g., notification and the like) indicating the location of the build artifact, which can be in the form of a URL or link, and can be sent as part of a request to cloud storage platform 680 for storing the build artifact at cloud storage platform 680. Moreover, build server 630 can specify a location at cloud storage platform 680 (which can also be in the form of a URL or link) to store the build artifact. In an embodiment, build server 630 is configured to utilize a pipeline, analogous to a publisher/subscriber messaging model, in which build artifacts, generated by build jobs, can be stored, in an automated manner, at a specified location(s) at cloud storage platform 680. Such a pipeline, in an example, can be implemented as a plugin (or set of plugins) that facilitate storing build artifacts in the manner described above.

Container platform 670, in an embodiment, is a service that provides a computing environment for executing applications in one or more respective instances of containers. As mentioned before, a container refers to a virtualized environment where an application(s) can be executed while being isolated from the underlying system. Containers can be compact and portable such that an application can start up in a relatively quick and easy manner within container platform 670. In an example, container platform 670 can be implemented on a single machine (e.g., server) that orchestrates and manages containers that are started within container platform 670 on that same machine. For example, a request to perform a job can be received by container platform 670 where such a job includes a set of tasks to execute a given container. Additionally, container platform can provide an API that can include functions for querying the status of containers (e.g., from client device 610), along with other operations to facilitate the management of such containers.

In an example, container platform 670 advantageously enables a user or developer to declaratively describe dependencies in a container image configuration file (e.g., a text document that contains the commands a user can call to generate a container image, where a container image refers to an executable package that contains data, source code, libraries, dependencies, tools, and other files for an application to execute). Such a container image configuration file can be understood as a script that, when processed, performs operations that generates (e.g., builds) a container image as described, in a declarative manner, in the container image configuration file.

The subject technology leverages container images that can be generated and executed by container platform 670 based at least in part on a container image configuration file that describes a container image for training a machine learning model. In an embodiment, a container is immutable such that the container and containerized application cannot be changed when either is executing. Thus, in some existing container platform systems, changes to a containerized application can require generating a new container image which reflects the changes, and subsequently executing as a new container with the changes to the application.

In comparison to the above, the subject system advantageously utilizes a particular container instance which serves as a baseline environment for training a machine learning model. In the event that changes to the machine learning model are necessitated or caused by the training process (described further below by way of example), the subject system does not require that a new container image be generated and can utilize the particular container instance that was already started.

In an embodiment, client device 610 can send a request to proxy authenticator 640 to initiate training of a machine learning model ("training request"), which includes a commit hash string corresponding to a particular build artifact. In an embodiment, proxy authenticator 640 manages and maintains tokens for users. In the request, a token that identifies the user ("user token") can be included which is utilized by proxy authenticator 640 to authenticate the request (e.g., the request is from a user that is authenticated and trusted by model training job manager 650). The subject system can generate user tokens for each user that commits code to code repository 620, which can be in the form of a hash string, or a unique identifier (e.g., a set of alphanumeric characters), and the like. In an embodiment, validation of the user token can be based on information stored in training database 660 that stores each token of each user that is authorized to training a machine learning model based on code committed into code repository 620.

Absent a successful validation of the user token, the request will not be forwarded to model training job manager 650 for processing. In this manner, the subject system provides a security mechanism where only requests with validated user tokens of particular users are allowed to be processed by model training job manager 650.

Model training job manager 650 receives the aforementioned training request and the user token, and can retrieve metadata information associated with the training job along with token information associated with the request from training database 660. Model training job manager 650 sends the request and user token to container platform 670 for completing within a container as discussed below. In an example, model training job manager 650 can periodically poll container platform 670 to determine whether the requested training job has completed and notify client device 610 of completion. Client device 610 can then request data corresponding to training artifacts 694 stored in cloud storage platform 680 (as discussed further below).

In an embodiment, container platform 670 receives the training request and the user token from model training job manager 650. Container platform 670 retrieves a particular container image for training machine learning models, and then starts a container based on the container image. Container platform 670 then retrieves a build artifact from training code 690 stored by cloud storage platform 680. In an example, container platform 670 also retrieves a virtual environment (which stored be in a cache as discussed below) for performing tasks related to the training request. A virtual environment, in this example, refers to an isolated environment that exists within a container for using the build artifact to perform operations for training the machine learning model. Such a virtual environment may provide mechanisms for installing dependencies (e.g., required packages) for the build artifact, wherein the virtual environment can be cached after being created. Container platform 670 also performs an access check using the user token to determine that access to training data 692 is authorized. Within the container, container platform 670 performs the training job using the build artifact, which can be performed within the virtual environment executing within the container. The training job generates at least one training artifact which is stored in training artifacts 694 on cloud storage platform 680. In an example, such training artifacts include a serialized model, evaluation data, and other information resulting from training the machine learning model.

Figure 7:
FIG. 7 is a flow diagram illustrating a method for pushing code changes, related to a machine learning model, to a code repository and sending a request for training the machine learning model using a build artifact, in accordance with some embodiments of the present disclosure.

FIG. 7 is a flow diagram illustrating a method 700 for pushing code changes, related to a machine learning model, to a code repository and sending a request for training the machine learning model using a build artifact, in accordance with some embodiments of the present disclosure. The method 700 may be embodied in computer-readable instructions for execution by one or more hardware components (e.g., one or more processors) such that the operations of the method 700 may be performed by components of software architecture 600. Accordingly, the method 700 is described below, by way of example with reference thereto. However, it shall be appreciated that the method 700 may be deployed on various other hardware configurations and is not intended to be limited to deployment within software architecture 600.

At operation 702, code repository 620 detects a code commit at a code repository. In an example, client device 610 can push a code commit to code repository 620 (e.g., by sending a request with a code commit command among other types of information), which is received by code repository 620 and processed. In an example, detecting the code commit includes generating a hash string value corresponding to the code commit, where the code commit includes code changes that are stored at the code repository 620. The hash string value is based at least in part on a cryptographic hash function in an example. The code repository 620 after (or as part of performing the commit command) committing the code to the corresponding repository generates a unique hash string value to associate with the code changes.

At operation 704, code repository 620 sends a request for a build job to a build server (e.g., build server 630). In an example, the request for the build job includes information related to the code commit such as the hash string value corresponding to the code commit.

At operation 706, code repository 620 determines that the build job is completed. A completed build job generates a build artifact which is then stored at a cloud storage platform (e.g., cloud storage platform 680). In an example, determining that the build job is completed includes receiving a request to store a build artifact, generated by the build job, at a location on a cloud storage platform. The location can be represented as a universal resource locator corresponding to a particular folder at the cloud storage platform. Such a request can be received by the cloud storage platform, which can be detected by code repository 620 through a polling mechanism or a command to request the status of the build job (e.g., using an API).

At operation 708, client device 610 sends a training request and user token to a proxy authenticator (e.g., proxy authenticator 640). The proxy authenticator 640, in an example, can validate the user token, and upon being validated, forward the training request and user token to model training job manager 650. Further, the training request can include the hash string value corresponding to the code commit.

At operation 710, proxy authenticator 640 determines that the user token is validated. In an example, proxy authenticator 640 can compare the value of the user token to a corresponding value of the user token stored in training database 660 to validate the user token.

At operation 712, proxy authenticator 640 sends a training request, including a training job, and the user token to a training job manager (e.g., model training job manager 650) to initiate further operations to train a machine learning model. Operations that are performed with respect to processing the training request to train the model is discussed below in connection with FIG. 8.

At operation 714, model training job manager 650 determines that the training job is completed. In an example, the training job manager 650 determines that the job is complete by receiving a message (e.g., a request message such as an HTTP request, and the like) from the containerized training job. In an example, this message includes information indicating the job status and whether or not the job finished successfully. If the information indicates that the job was unsuccessful, the message includes information related to the error that occurred during the job. Alternatively, when the information indicates that the job was successful, the message includes an identifier of the serialized model and URIs for output artifacts.

Figure 8:
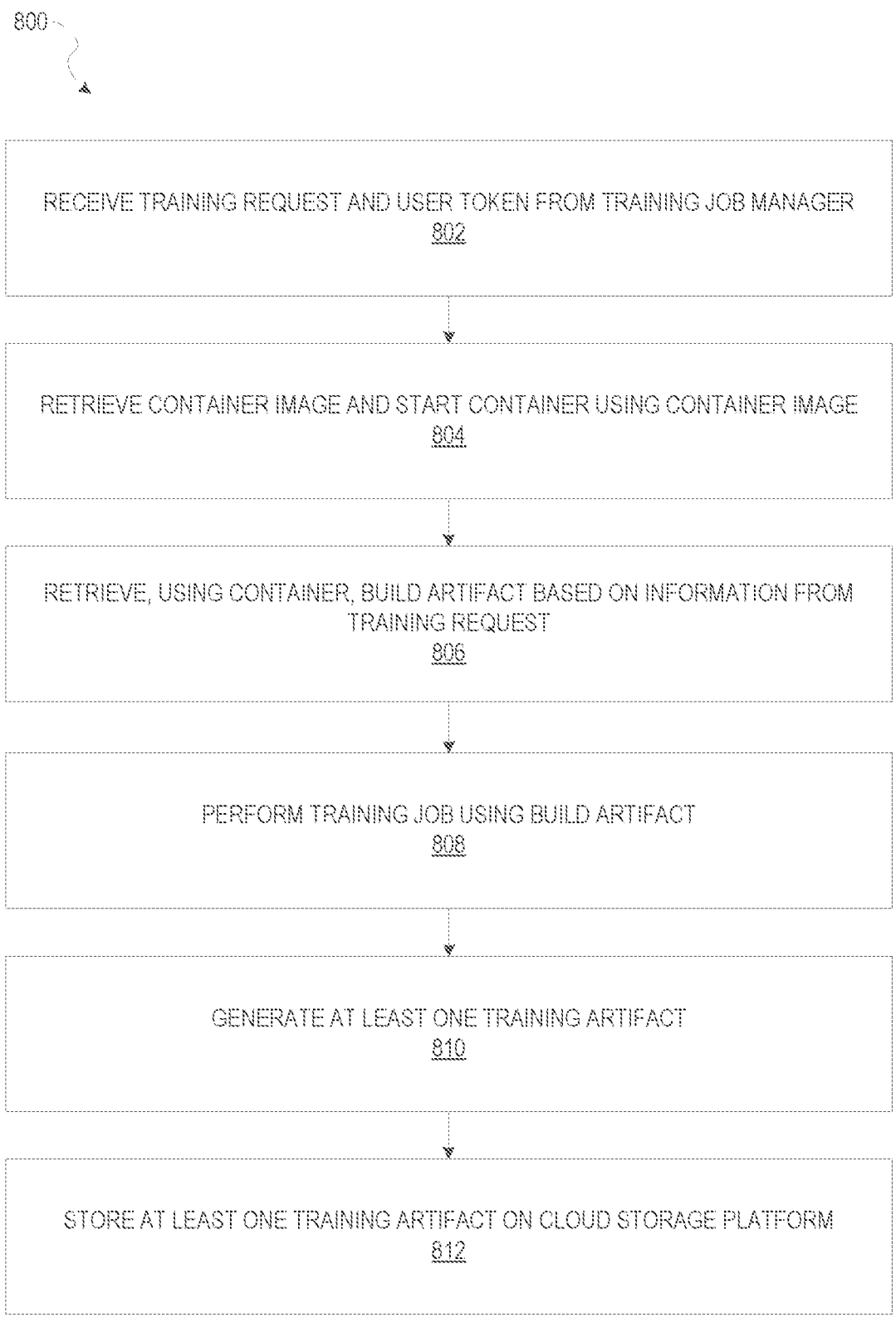
FIG. 8 is a flow diagram illustrating a method for processing a request for training a machine learning model in a container platform, in accordance with some embodiments of the present disclosure

FIG. 8 is a flow diagram illustrating a method 800 for processing a request for training a machine learning model in a container platform, in accordance with some embodiments of the present disclosure. The method 800 may be embodied in computer-readable instructions for execution by one or more hardware components (e.g., one or more processors) such that the operations of the method 800 may be performed by components of software architecture 600. Accordingly, the method 800 is described below, by way of example with reference thereto. However, it shall be appreciated that the method 800 may be deployed on various other hardware configurations and is not intended to be limited to deployment within software architecture 600.

At operation 802, container platform 670 receives a training request and the user token. As discussed above, the training request can include a training job (e.g., a set of tasks to perform in order to train the machine learning model).

At operation 804, container platform 670 retrieves a container image and starts a container using the container image.

At operation 806, container platform 670 retrieves, using the container, a build artifact generated by the build job.

At operation 808, container platform 670 performs the training job using the build artifact. In an example, container platform 670 unpacks the build artifact into a local directory within the container. Container platform 670 creates a virtual environment within the container. Container platform 670 performs a set of tasks related to the training job within the virtual environment. Container platform 670 deletes data from the local directory after performing the set of tasks. In an example, the virtual environment is an isolated environment executing within the container, the isolated environment having a set of packages installed that are utilized for performing the set of tasks.

At operation 810, container platform 670 generates at least one training artifact. Examples of a training artifact include a serialized machine learning model, evaluation data, or any other data that is generated as part of training the machine learning model.

At operation 812, container platform 670 stores the at least one training artifact on a cloud storage platform. In an example, the at least one training artifact is stored in a specified folder at cloud storage platform 680.

The following discussion relates to various terms and phrases that are mentioned in the disclosure.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant (e.g., a merchant 510 of FIG. 5) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

With reference to a high-level description illustrated in FIG. 5, in some examples described more fully below, the payment processor includes selected functionality of both the payment processor 530 and the processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2020, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a request to perform a machine learning model training job;
initiating, based on a particular container image corresponding to machine learning model training, a container for performing the machine learning model training job;
retrieving a build artifact corresponding to the machine learning model training job;
performing, in the container, the machine learning model training job using the build artifact corresponding to the machine learning model training job; and
providing an indication that the machine learning model training job has been performed.

2. The method of claim 1, wherein performing, in the container, the machine learning model training job using the build artifact corresponding to the machine learning model training job comprises:
performing, in the container, the machine learning model training job using the build artifact to generate a training artifact.

3. The method of claim 2, further comprising storing the training artifact, wherein the indication that the machine learning model training job has been performed comprises a network identifier corresponding to the stored training artifact.

4. The method of claim 2, wherein the training artifact comprises at least one of a serialized machine learning model or evaluation data.

5. The method of claim 1, wherein the indication that the machine learning model training job has been performed comprises information related to an error that occurred while performing the machine learning model training job.

6. The method of claim 1, wherein the request comprises an identifier of the build artifact, and wherein retrieving the build artifact corresponding to the machine learning model training job comprises:
retrieving the build artifact based at least in part on the identifier of the build artifact.

7. The method of claim 1, wherein the request comprises a user token, and wherein the method further comprises:
performing an access check using the user token to determine that access to the build artifact is authorized.

8. The method of claim 1, wherein retrieving the build artifact corresponding to the machine learning model training job comprises:
retrieving a virtual environment for performing the machine learning model training job.

9. The method of claim 8, wherein performing, in the container, the machine learning model training job using the build artifact corresponding to the machine learning model training job comprises:
performing, in the container, the machine learning model training job in the virtual environment using the build artifact.

10. A device comprising:
a memory; and
at least one processor configured to:
receive a request to perform a machine learning model training job;
initiate, based on a particular container image corresponding to machine learning model training, a container for performing the machine learning model training job;
retrieve a build artifact corresponding to the machine learning model training job;
perform, in the container, the machine learning model training job using the build artifact corresponding to the machine learning model training job to generate a training artifact; and
store the training artifact.

11. The device of claim 10, wherein the at least one processor is further configured to:
provide an indication that the machine learning model training job has been performed, wherein the indication comprises a network identifier corresponding to the training artifact.

12. The device of claim 10, wherein the training artifact comprises at least one of a serialized machine learning model or evaluation data, and wherein the build artifact comprises at least one of a compressed file, an archived file, or a package.

13. The device of claim 10, wherein the request comprises an identifier of the build artifact, and wherein the at least one processor is further configured to retrieve the build artifact based at least in part on the identifier of the build artifact.

14. The device of claim 10, wherein the request comprises a user token, and wherein the at least one processor is further configured to:
perform an access check using the user token to determine that access to the build artifact is authorized.

15. The device of claim 10, wherein the at least one processor is further configured to:
retrieve a virtual environment for performing the machine learning model training job; and
perform, in the container, the machine learning model training job in the virtual environment using the build artifact.

16. A non-transitory machine-readable medium storing instructions that, when executed by one or more processors, cause the one or more processors to perform operations comprising:
receiving a request to perform a machine learning model training job, wherein the request comprises an identifier of a build artifact;
initiating, based on a particular container image corresponding to machine learning model training, a container for performing the machine learning model training job;

retrieving the build artifact based at least in part on the identifier of the build artifact;

performing, in a container, the machine learning model training job using the retrieved build artifact to generate a training artifact; and performing at least one of: providing an indication that the machine learning model training job has been performed or storing the training artifact.

17. The non-transitory machine-readable medium of claim 16, wherein the indication that the machine learning model training job has been performed comprises a network identifier corresponding to the stored training artifact.

18. The non-transitory machine-readable medium of claim 16, wherein the training artifact comprises at least one of a serialized machine learning model or evaluation data.

19. The non-transitory machine-readable medium of claim 16, wherein retrieving the build artifact based at least in part on the identifier of the build artifact comprises:

retrieving a virtual environment for performing the machine learning model training job.

20. The non-transitory machine-readable medium of claim 19, wherein performing, in the container, the machine learning model training job using the retrieved build artifact to generate the training artifact comprises;

performing, in the container, the machine learning model training job in the virtual environment using the build artifact.

\* \* \* \* \*